(12) United States Patent
Christoffel et al.

(10) Patent No.: US 7,188,906 B2
(45) Date of Patent: Mar. 13, 2007

(54) LOCKING MECHANISM FOR A VEHICLE SEAT

(75) Inventors: Thomas Christoffel, Herschweiler (DE); Volker Windecker, Sippersfeld (DE); Peter Müller, Kaiserslautern (DE); Kadir Yasaroglu, Ingolstadt (DE); Holger Trautmann, Kirkel (DE); Carsten Bäumchen, Oberthal (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/197,985

(22) Filed: Aug. 5, 2005

(65) Prior Publication Data

US 2006/0006673 A1    Jan. 12, 2006

Related U.S. Application Data

(63) Continuation of application No. PCT/EP2004/000949, filed on Feb. 3, 2004.

(30) Foreign Application Priority Data

Feb. 8, 2003  (DE) ................. 103 05 177

(51) Int. Cl.
  *B60N 2/36* (2006.01)
  *B60N 2/00* (2006.01)
(52) U.S. Cl. ................... 297/378.13; 297/336
(58) Field of Classification Search ............... 297/336, 297/378.13
See application file for complete search history.

(56) References Cited

U.S. PATENT DOCUMENTS

| 4,765,682 | A * | 8/1988 | Satoh ................ 297/378.13 |
| 5,634,686 | A * | 6/1997 | Okazaki .................. 297/336 |
| 6,345,856 | B1 * | 2/2002 | Minai .................... 297/336 X |
| 6,345,867 | B1 * | 2/2002 | Hellrung et al. ........... 297/336 |
| 6,412,849 | B1 * | 7/2002 | Fast .................... 297/336 X |
| 6,478,358 | B1 * | 11/2002 | Okazaki et al. ......... 297/336 X |
| 6,547,302 | B1 * | 4/2003 | Rubio et al. ....... 297/378.13 X |
| 6,595,587 | B2 * | 7/2003 | Konishi et al. ........ 297/336 X |
| 6,698,837 | B2 * | 3/2004 | Pejathaya et al. ...... 297/336 X |
| 6,715,841 | B2 | 4/2004 | Christoffel et al. |
| 6,733,078 | B1 * | 5/2004 | Zelmanov ......... 297/378.13 X |
| 2005/0023877 | A1 * | 2/2005 | Vermeulen ............ 297/378.13 |

FOREIGN PATENT DOCUMENTS

| DE | 35 10 006 C1 | 6/1986 |
| DE | 39 11 135 A1 | 10/1990 |
| EP | 0 171 032 A2 | 2/1986 |
| EP | 1 138 547 A1 | 10/2001 |
| WO | WO 02/078998 A1 | 10/2002 |

* cited by examiner

Primary Examiner—Rodney B. White
(74) Attorney, Agent, or Firm—Womble Carlyle Sandridge & Rice, PLLC

(57) ABSTRACT

In the case of a locking mechanism (1) for a vehicle seat, in particular for a motor vehicle seat, having an open housing (5), a latch (11) which is mounted pivotably on the housing (5) and is intended for locking with a mating element (B), and at least one securing element (25, 31) which is likewise mounted pivotably on the housing (5) and, by interaction with the latch (11), secures a locked state, the locking mechanism (1) is attachable to a structural part (41), and the structural part (41) forms the cover for the substantial closing of the housing (5).

27 Claims, 3 Drawing Sheets

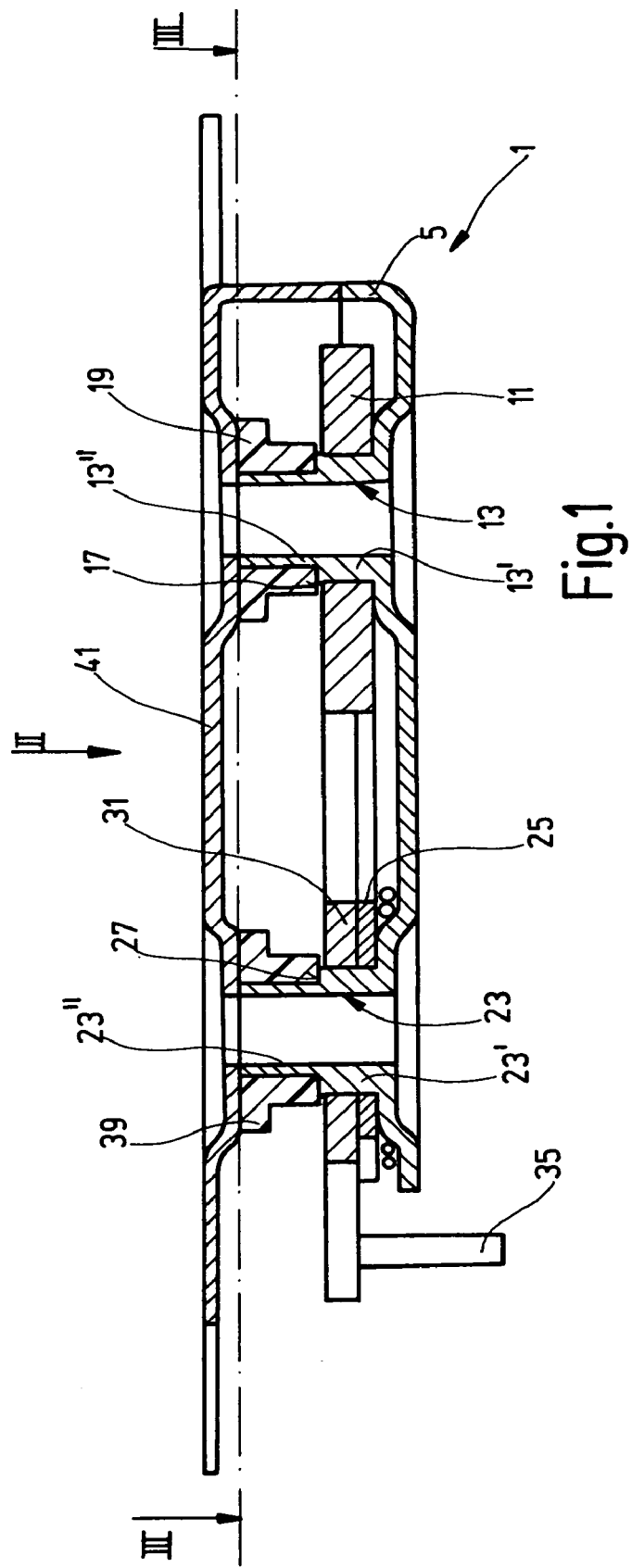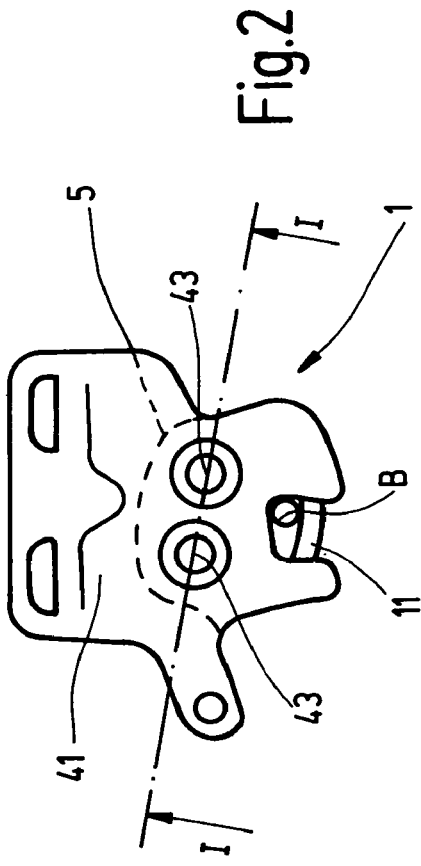

LOCKING MECHANISM FOR A VEHICLE SEAT

CROSS-REFERENCE TO RELATED APPLICATION

The present application is a continuation of International Application PCT/EP2004/000949, which was filed Feb. 3, 2004, and is incorporated herein by reference, in its entirety.

BACKGROUND OF THE INVENTION

The present invention relates to a locking mechanism for a vehicle seat, in particular for a motor vehicle seat, with the locking mechanism having a housing, a latch which is mounted pivotably on the housing and is intended for locking with a mating element, and at least one securing element which is likewise mounted pivotably on the housing and, by interaction with the latch, secures a locked state, the locking mechanism being attachable to a structural part.

In the case of a known locking mechanism of the type described immediately above, the latch and two securing elements are arranged within a substantially closed housing. The completely operative locking mechanism which also already has its full strength is then attached as a whole to a structural part, for example an adaptation part, or directly to a supporting part of the structure.

BRIEF SUMMARY OF SOME ASPECTS OF THE INVENTION

An aspect of the present invention is the provision of improvements to a locking mechanism of the type described above. In accordance with one aspect of the present invention, a locking mechanism for a vehicle seat, in particular for a motor vehicle seat, has an open housing, a latch which is mounted pivotably on the housing and is intended for locking with a mating element, and at least one securing element which is likewise mounted pivotably on the housing and, by interaction with the latch, secures a locked state, with the locking mechanism being attachable to a structural part so that the structural part forms a cover for substantially closing the housing.

Because the structural part forms the cover for substantially closing the housing, a separate cover does not have to be provided, which saves material, weight and construction space and, in particular, avoids unnecessary doublings of material. The locking mechanism, which is preferably already operative and testable for normal use and is opened toward one side, obtains its full strength, in particular with regard to the loads in the event of a crash, by attachment to the structural part. At the same time, the components within the locking mechanism are protected from damage and dirt by the housing being closed.

The solution according to the invention also provides a modular system in which the base functions, in particular the locking function, are integrated in a base component, namely the actual locking mechanism, while customer-specific functions, such as fastening of panels, connecting adaptation to the structure or the like, are integrated under the structural part as a customer-specific component. The base component can then be produced in a high piece number, i.e. more cost-effectively, and, in addition, the customer-specific components can take place at the end of the installation sequence, i.e. the base component can be preassembled as a module. The load-bearing capacity may also be kept variable, i.e. can be matched customer-specifically to the particular requirements via the customer-specific structural parts, so that overdimensions are avoided.

In order to keep the housing and structural part axially together and therefore the connection of the two components, one or more bolts are preferably provided, these also being understood as meaning screws, rivets or other fastening elements which are secured with a cohesive material joint and/or in a form-fitting manner at the ends, i.e. generally bear against the housing or the structural part on the outwardly facing side or are connected thereto. Bolts of this type are preferably arranged in the region of the bearing points for the latch and/or the securing elements provided, in particular in the center of the bearing points, which are then of hollow design. Alternatively, the bolts themselves can form the bearing points. Components are preferably provided for axially securing the latch and/or the securing elements, with the axially securing components providing the axially securing before the locking mechanism is attached to the structural part, which improves the testability and imposes lower demands on the tolerances of the structural part.

In one preferred embodiment, the latch and/or the securing element or the securing elements is/are mounted on a projection which is integrally formed on the housing, which is more cost-effective than the production of special bearing bolts and permits the use of screws for the cost-effective attachment to the structural part. The projection may have a step which separates bearing sections of different outside diameter from one another and therefore forms a defined stop. The latch and/or the securing elements provided can therefore be mounted on the bearing section of larger outside diameter which is placed further inward in the housing while a retaining ring (or an other axially securing and/or distance-maintaining intermediate element) and/or the structural part is/are seated on the bearing section of smaller outside diameter which is placed further outward. If an intermediate element is pushed on as far as the stop, said intermediate element, for its part, preferably forms a bearing for the structural part or the cover, i.e. a defined stop.

In a locking mechanism with increased locking reliability and increased load-bearing capacity in the event of a crash, a clamping eccentric and an intercepting component are provided as securing elements, the spring-loaded clamping eccentric acting in the locked state upon the latch with a closing moment and the intercepting component supporting the latch in the event of a crash.

The locking mechanism according to the invention can be used at different points of a vehicle seat, for example for connecting the entire vehicle seat to the floor or as a backrest lock for fastening the backrest to the vehicle structure, with the locking mechanism being attached to a structural part fixed on the seat structure or a structural part fixed on the vehicle structure and the mating element correspondingly being fixed to the vehicle structure or fixed to the seat structure. The locking mechanism may also be integrated in an articulated fitting which is provided for setting the inclination of the backrest, in particular if one of the fitting parts is to be designed as a hollow box.

Other aspects and advantages of the present invention will become apparent from the following.

BRIEF DESCRIPTION OF THE DRAWINGS

The invention is explained in greater detail below with reference to two exemplary embodiments which are illustrated in the drawings, in which:

FIG. 1 shows a section through the first exemplary embodiment along the line I—I in FIGS. 2 and 3, FIG. 2 shows a side view of the first exemplary embodiment with the view being in the direction of the arrow II in FIG. 1.

DETAILED DESCRIPTION OF THE INVENTION

Figure 3:
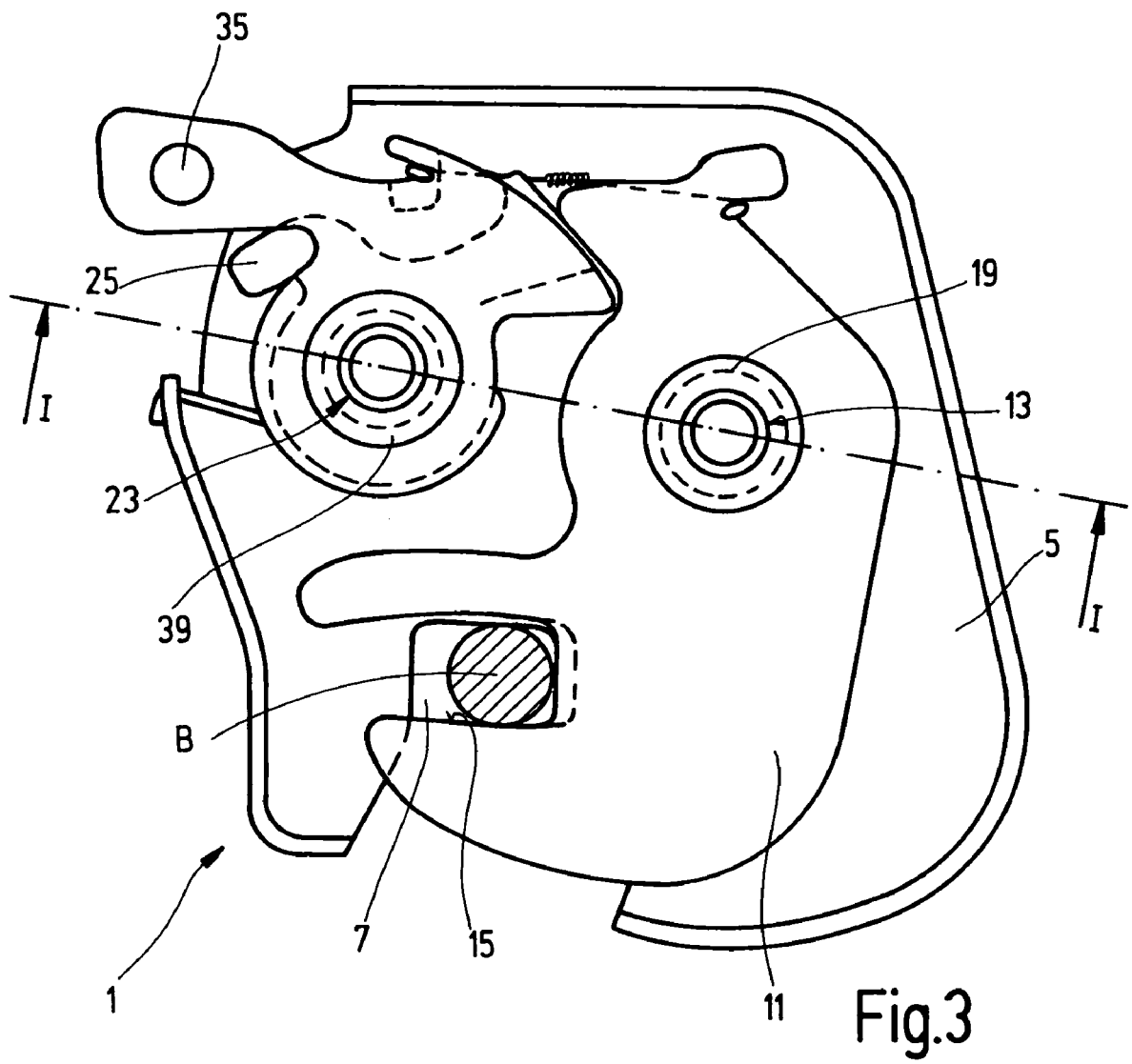
FIG. 3 shows a section through the first exemplary embodiment along the line III—III in FIG. 1 without the structural part.
Figure 4:
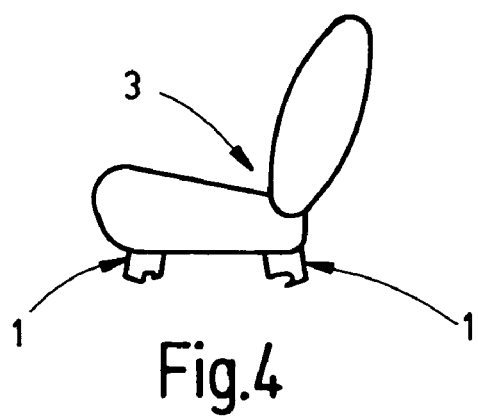
FIG. 4 is a schematized illustration of a vehicle seat.
Figure 5:
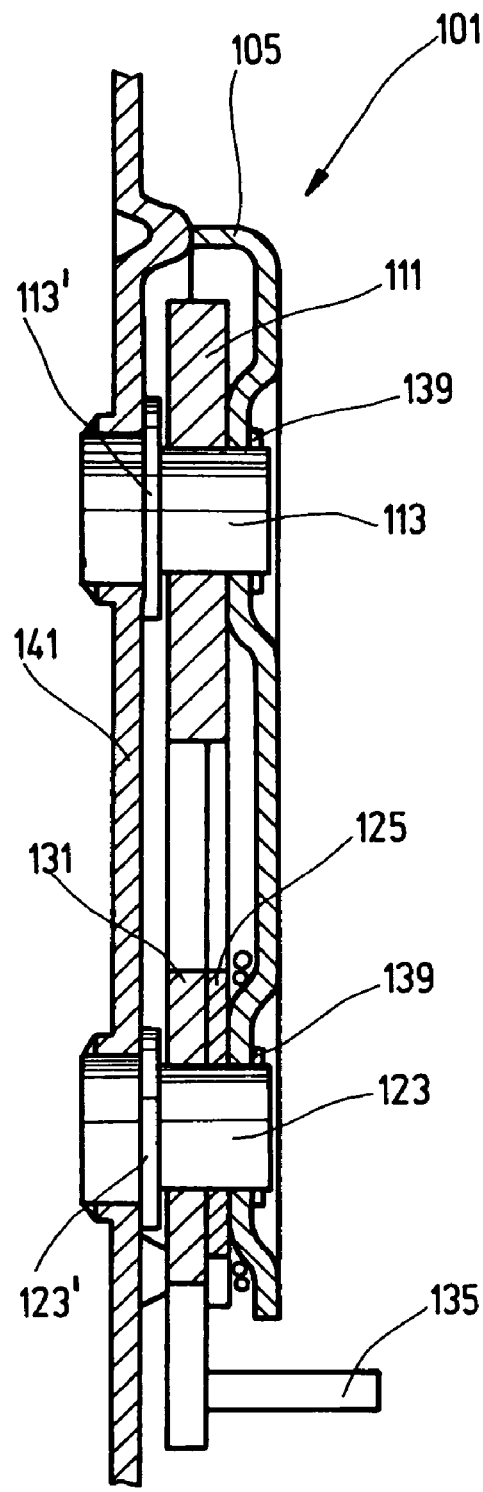
FIG. 5 shows a section through the second exemplary embodiment along the line V—V in FIG. 6.
Figure 6:
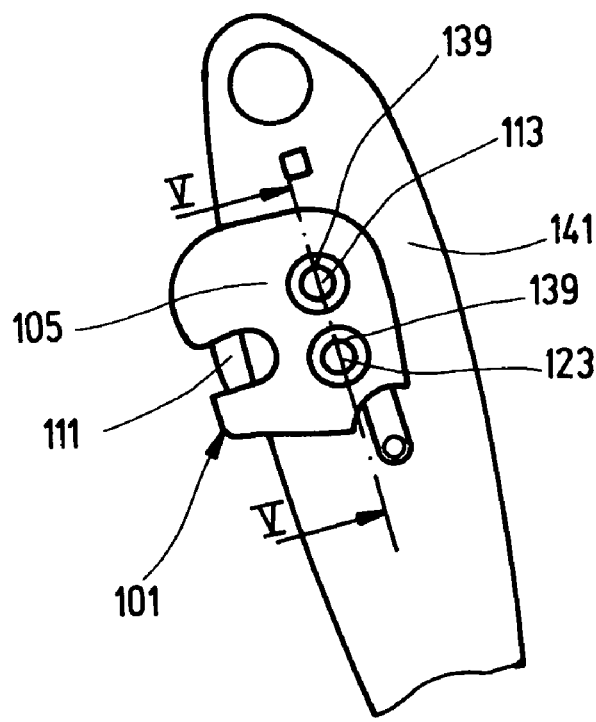
FIG. 6 shows a side view of the second exemplary embodiment.

In the first exemplary embodiment, a locking mechanism 1 is provided for connecting a vehicle seat 3 to the floor in a motor vehicle. The locking mechanism 1 has an open housing 5 with a planar base surface and raised edges. The base surface of the locking mechanism 1 is oriented vertically and in the direction of travel, and defines the directional indications used below. A bolt receptacle 7 is formed in the lower region of the housing 5. The bolt receptacle 7 opens downward and serves to receive a bolt B fixed to the vehicle structure, or another mating element. In this case, the width of the bolt receptacle 7 is larger than the diameter of the bolt B in order to compensate for tolerances. The mating element may also be a section of a clip.

A latch 11 is mounted pivotably on a first projection 13. The first projection 13 is integrally formed on the housing 5, i.e. is formed in a manner known per se from the material of the housing 5, and protrudes perpendicularly from the base surface of the housing 5. For interaction with the bolt B, the latch 11 has a hook mouth 15. In a locked state of the locking mechanism 1, the mouth 15 extends crosswise with respect to the bolt receptacle 7. The hook mouth 15 is open with respect to the bolt receptacle 7 in an opened state. The first projection 13 has approximately in the center in the axial direction a first step 17 which separates a first, inner bearing section 13' of larger outside diameter placed closer to the housing 5 from a first, outer bearing section 13" of smaller outside diameter placed at the free end of the first projection 13. In this case, the inside diameters of the two first bearing sections 13' and 13" are identical. The latch 11 is mounted on the first inner bearing section 13' while a first retaining ring 19 of plastic is pushed, in particular pressed, onto the first outer bearing section 13" from the free end of the first projection 13 as far as the first stop 17. The first retaining ring 19 secures the latch 11 in the axial direction. A flange is integrally formed on the first retaining ring 19 on the side facing away from the latch 11.

A second projection 23 of basically identical design to the first projection 13 is integrally formed on the housing 5 at a distance from the first projection 13. A spring-loaded clamping eccentric 25 is mounted pivotably on the second projection 23 and is prestressed in the direction of the latch 11 and acts upon the latch in the locked state with a closing moment and, as a result, keeps the latch 11 in engagement with the bolt B. Corresponding to the first projection 13, the second projection 23 has a second step 27 that is provided in the axial direction approximately in the center and separates a second inner bearing section 23' of larger outside diameter placed closer to the housing 5 from a second outer bearing section 23" of smaller outside diameter placed at the free end of the second projection 23. In this case, the inside diameters of the two second bearing sections 23' and 23" are identical. The clamping eccentric 25 is mounted on the second inner bearing section 23'.

Furthermore, an intercepting component 31, which is prestressed toward the latch 11 by a spring, is also mounted pivotably on the second inner bearing section 23' of the second projection 23. In the normal situation, the intercepting component 31 is arranged at a distance from the latch 11. In the event of a crash, if the latch 11 experiences an opening moment and presses away the clamping eccentric 25, the latch 11 comes to bear against the intercepting component 31 which supports the latch 11 and prevents it from opening. On an arm of the intercepting component 31, a release bolt 35 protrudes perpendicularly from the intercepting component 31, i.e. parallel to the projections 13 and 23. By moving this release bolt 35 out of the locked state downward, for example via a lever or a Bowden cable, the intercepting component 31 pivots away from the latch 11, using an integrally formed driver to carry along the clamping eccentric 25, if appropriate after a small occurrence of the intercepting component 31 pivoting relative to the clamping eccentric 25. The latch 11 is then no longer secured and is pulled up—for example via the spring coupling to the intercepting component 31. The clamping eccentric 25 and the intercepting component 31 are therefore securing elements for the latch 11 both in the locked and in the open state.

A second retaining ring 39 is pushed, in particular pressed, onto the second outer bearing section 23" of the second projection 23 as far as the second step 27. The second retaining ring 39 is identical to the first retaining ring 19, i.e. is also composed of plastic and has an integrally formed flange. The second retaining ring 39 secures the clamping eccentric 25 and the intercepting component 31 in the axial direction.

With the components described above, the locking mechanism 1 is already operative for normal use, i.e. forms a testable unit, even if the housing 5 is still open. In order to achieve full strength in the event of a crash, the housing 5 is to be largely closed, except for the region of the bolt receptacle 7 and the unlocking bolt 35, and the bearing points are to be reinforced. As a cover for the housing 5, use is made, according to the invention, of a structural part 41 of the structure of the vehicle seat 3, which part is primarily designed for adaptation of the locking mechanism 1 to the specific structure of the vehicle seat 3 and is therefore specific to the vehicle seat. The structural part 41 bears against those end sides of the retaining rings 19 and 39 which are enlarged by their flanges and point away from the housing 5. Two identical fastening bolts 43 or other fastening elements are plugged in the axial direction through the first projection 13 and second projection 23 and are riveted (or connected in another form-fitting manner) or welded (or connected with another cohesive material joint) to the housing 5 and the structural part 41, so that the bearing points defined by the projections 13 and 23 can be subjected to a high load both in the axial direction and in the radial direction.

In a modification to the first exemplary embodiment, the retaining rings 19 and 39 are omitted, so that the structural part 41 bears directly against the offsets 17 and 27. Since the structural part 41 then also has to ensure the axial securing of the latch 11, clamping eccentric 25 and intercepting component 31, i.e. the operativeness of the modified locking mechanism, there are greater demands on the tolerance accuracy of the structural part.

The second exemplary embodiment is identical to the first exemplary embodiment except as described differently below; therefore, components which are identical and have an identical effect bear reference numbers higher by 100. The locking mechanism 101 of the second exemplary embodiment likewise has a unit which is operative and testable for normal use. The locking mechanism 101 includes an open housing 105, a pivotable latch 111, a prestressed clamping eccentric 125, an intercepting component 131, and a release bolt 135. The pivotable latch 111 is mounted on a first bearing bolt 113, and the first bearing bolt 113 is seated fixedly in the housing 105. The prestressed clamping eccentric 125 is mounted pivotably on a corresponding second bearing bolt 123, and is intended for acting upon the latch 111 with a closing moment in the locked state. The intercepting component 131 is likewise mounted pivotably on the second bearing bolt 123 and is intended for supporting the latch 111 in the event of a crash. The release bolt 135 protrudes from the intercepting component 131. By means of integrally formed flanges 113' and 123', which are at the end facing away from the housing 105, and retaining rings 139 matched in a form-fitting manner at the other end of to the two bearing bolts 113 and 123, the two bearing bolts 113 and 123 ensure that the components are secured axially.

In this case too, the full strength is achieved by a connection to a structural part 141, in the present case to a backrest strut, which largely closes the housing 105 as a cover. The two bearing bolts 113 and 123 are plugged in a form-fitting manner into corresponding openings of the structural part 141, the flanges 113' and 123' bearing against the structural part 141. Then, the two bearing bolts 113 and 123 are connected to the structural part 141, for example welded (or connected with another cohesive material joint) or riveted (or connected in another form-fitting manner).

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A locking mechanism for a vehicle seat, wherein the locking mechanism is for being locked to a mating element that is fixed on a vehicle or fixed on the vehicle seat, the locking mechanism is for mounting to a structural part fixed on a structure, and the structure is selected from the group consisting of the vehicle seat and the vehicle, the locking mechanism comprising:
   a housing having at least a first opening and a second opening, wherein
      (a) the first opening is a receptacle for receiving the mating element,
      (b) the locking mechanism is configured for being attached to the structural part so that the structural part substantially closes the housing by at least substantially covering the second opening,
      (c) the second opening is larger than the receptacle, and
      (d) the second opening is sized so that the housing is substantially open prior to any attachment of the locking mechanism to the structural part;
   a pivot connected to a base of the housing;
   a latch pivotably mounted to the pivot
      (a) for locking with the mating element by being in a locked state while the mating element is in the receptacle,
      (b) so that the latch obstructs the receptacle during the locked state,
      (c) so that the latch is capable of being in the locked state while the housing is substantially open prior to any attachment of the locking mechanism to the structural part;
   at least one securing element pivotably mounted to the housing
      (a) for interacting with the latch and thereby releasably securing the latch in the locked state, and
      (b) so that the at least one securing element is capable of interacting with the latch and thereby releasably securing the latch in the locked state while the housing is substantially open prior to any attachment of the locking mechanism to the structural part; and
   at least one retaining component that is positioned on the pivot for restricting the latch from moving past an end of the pivot while the housing is substantially open prior to any attachment of the locking mechanism to the structural part, wherein the latch is positioned between the retaining component and the base of the housing,
   whereby operability of the locking mechanism is capable of being tested while the housing is substantially open prior to any attachment of the locking mechanism to the structural part, and
   wherein the operability of the locking mechanism comprises
      (a) the latch being capable of being in the locked state while the housing is substantially open prior to any attachment of the locking mechanism to the structural part, and
      (b) the at least one securing element being capable of interacting with the latch and thereby releasably securing the latch in the locked state while the housing is substantially open prior to any attachment of the locking mechanism to the structural part.

2. The locking mechanism according to claim 1 in combination with the structural part, wherein:
   the locking mechanism is attached to the structural part so that
      (a) the structural part substantially closes the housing by at least substantially covering the second opening, and
      (b) the locking mechanism is strengthened by the structural part;
   the housing includes an outermost periphery; and
   the structural part includes an outermost periphery that is substantially larger than the outermost periphery of the housing.

3. The combination according to claim 2, further comprising at least one fastening element mounted for axially holding the housing and the structural part together, wherein at least one end of the fastening element is attached with at least one attachment selected from the group consisting of a cohesive material joint attachment and a form-fitting attachment.

4. The locking mechanism according to claim 1 in combination with the structural part, wherein:
   the locking mechanism is attached to the structural part so that the structural part substantially closes the housing by at least substantially covering the second opening,
   the combination further comprises at least one fastening element mounted for axially holding the housing and the structural part together, and
   at least one end of the fastening element is mounted by way of at least one attachment selected from the group consisting of a cohesive material joint attachment and a form-fitting attachment.

5. The locking mechanism according to claim 4, wherein the locking mechanism is strengthened by the fastening element.

6. The locking mechanism according to claim 4, wherein the latch being pivotably mounted to the housing comprises the latch being pivotably supported by the fastening element.

7. The locking mechanism according to claim 4, wherein the at least one securing element being pivotably mounted to the housing comprises the at least one securing element being pivotably supported by the fastening element.

8. The locking mechanism according to claim 4, wherein:
the latch being pivotably mounted to the housing comprises the latch being pivotably supported a first location;
the at least one securing element being pivotably mounted to the housing comprises the at least one securing element being pivotably supported at a second location; and
the fastening element is proximate at least one of the first location and the second location.

9. The locking mechanism according to one of claim 1, wherein:
the latch being pivotably mounted to the housing comprises the latch being pivotably mounted on a first member that extends from the housing;
the at least one securing element being pivotably mounted to the housing comprises the at least one securing element being pivotably mounted on a second member that extends from the housing; and
at least one member selected from the first and second members comprises a projection which is integrally formed on the housing.

10. A locking mechanism for a vehicle seat, wherein the locking mechanism is for being locked to a mating element that is fixed on a vehicle or fixed on the vehicle seat, the locking mechanism is for mounting to a structural part fixed on a structure, and the structure is selected from the group consisting of the vehicle seat and the vehicle, the locking mechanism comprising:
a housing having at least one opening;
a latch pivotably mounted to the housing for locking with the mating element; and
at least one securing element pivotably mounted to the housing for interacting with the latch and thereby releasably securing the locking mechanism in a locked state,
wherein
(a) the locking mechanism is configured for being attached to the structural part so that the structural part substantially closes the housing by at least partially covering the opening;
(b) the latch being pivotably mounted to the housing comprises the latch being pivotably mounted on a first member that extends from the housing,
(c) the at least one securing element being pivotably mounted to the housing comprises the at least one securing element being pivotably mounted on a second member that extends from the housing,
(d) at least one member selected from the first and second members comprises a projection which is integrally formed on the housing, and
(e) the projection includes
(1) bearing sections of differing outside diameter, and
(2) a step which separates the bearing sections of differing outside diameter from one another.

11. The locking mechanism according to claim 10, wherein:
the bearing sections of differing outside diameter includes a first bearing section and a second bearing section;
the first bearing section has a larger outside diameter than the second bearing section;
the latch or the at least one securing element is mounted on the first bearing section; and
at least one of the structural part and an intermediate element is seated on the second bearing section.

12. The locking mechanism according to claim 1, wherein the at least one securing element comprises a spring-loaded clamping eccentric and an intercepting component, with the spring-loaded clamping eccentric acting in the locked state upon the latch with a closing moment and the intercepting component supporting the latch in the event of a crash.

13. The locking mechanism according to claim 1 in combination with vehicle seat, wherein:
the structure is the vehicle seat;
the structural part is fixed on the vehicle seat;
the locking mechanism is attached to the structural part so that the structural part substantially closes the housing by at least substantially covering the second opening; and
the locking mechanism is operative for performing at least one function selected from the group consisting of
connecting to a floor, and
locking a backrest of the vehicle seat.

14. The locking mechanism according to one of claim 1, wherein:
the at least one securing element being pivotably mounted to the housing comprises the at least one securing element being pivotably mounted on a member that extends from the housing; and
member comprises a projection which is integrally formed on the housing.

15. The locking mechanism according to claim 1, wherein the housing being substantially open prior to any attachment of the locking mechanism to the structural part comprises:
substantially an entire side of the housing being open prior to any attachment of the locking mechanism to the structural part.

16. The locking mechanism according to claim 1, wherein:
the base of the housing includes raised edges;
the receptacle extends through at least the base; and
the raised edges at least partially
(a) define the second opening, and
(b) extend around the second opening.

17. The locking mechanism according to claim 1, wherein:
the housing further includes a third opening; and
the at least one securing element includes a release mechanism that extends through the third opening.

18. The locking mechanism according to claim 1 in combination with the structural part, wherein:
the locking mechanism is attached to the structural part so that the structural part substantially closes the housing by at least substantially covering the second opening, and
the mating element is fixed on one of the vehicle and the vehicle seat, whereas the other of the vehicle and the vehicle seat is the structure that the structural part is fixed on.

19. The locking mechanism according to claim 1, wherein:
the pivot is a projection of the housing; and the projection includes
(a) bearing sections of differing outside diameter, and
(b) a step which separates the bearing sections of differing outside diameter from one another.

20. The locking mechanism according to claim 1, wherein:
the pivot is a first pivot;
the retaining component is a first retaining component;
the at least one securing element being pivotably mounted to the housing comprises the at least one securing element being pivotably mounted on a second pivot that is connected to the housing; and
at least a second retaining component is positioned on the second pivot for restricting the at least one securing element from moving past an end of the second pivot while the housing is substantially open prior to any attachment of the locking mechanism to the structural part, wherein the at least one securing element is positioned between the second retaining component and the base of the housing.

21. A locking mechanism for a vehicle seat, wherein the locking mechanism is for being locked to a mating element that is fixed on a vehicle or fixed on the vehicle seat, the locking mechanism is for mounting to a structural part fixed on a structure, and the structure is selected from the group consisting of the vehicle seat and the vehicle, the locking mechanism comprising:
a housing having at least a first opening and a second opening, wherein
(a) the first opening is a receptacle for receiving the mating element,
(b) the locking mechanism is configured for being attached to the structural part so that the structural part substantially closes the housing by at least substantially covering the second opening,
(c) the second opening is larger than the receptacle, and
(d) the second opening is sized so that the housing is substantially open prior to any attachment of the locking mechanism to the structural part;
a latch pivotably mounted to the housing
(a) for locking with the mating element by being in a locked state while the mating element is in the receptacle,
(b) so that the latch obstructs the receptacle during the locked state,
(c) so that the latch is capable of being in the locked state while the housing is substantially open prior to any attachment of the locking mechanism to the structural part;
a pivot connected to a base of the housing;
a spring-loaded clamping eccentric pivotably mounted to the pivot
(a) for acting upon the latch with a closing moment during the locked state, and
(b) so that the spring-loaded clamping eccentric is capable of interacting with the latch and thereby releasably securing the latch in the locked state while the housing is substantially open prior to any attachment of the locking mechanism to the structural part;
an intercepting component pivotably mounted to the pivot for supporting the latch in the event of a crash; and
at least one retaining component that is positioned on the pivot for restricting the spring-loaded clamping eccentric and the intercepting component from moving past an end of the pivot while the housing is substantially open prior to any attachment of the locking mechanism to the structural part, wherein the spring-loaded clamping eccentric and the intercepting component are positioned between the retaining component and the base of the housing.

22. The locking mechanism according to claim 21, wherein:
the locking mechanism is configured so that operability of the locking mechanism is capable of being tested while the housing is substantially open prior to any attachment of the locking mechanism to the structural part;
the operability of the locking mechanism comprises
(a) the latch being capable of being in the locked state while the housing is substantially open prior to any attachment of the locking mechanism to the structural part, and
(b) the spring-loaded clamping eccentric being capable of interacting with the latch and thereby releasably securing the latch in the locked state while the housing is substantially open prior to any attachment of the locking mechanism to the structural part;
the housing being substantially open, prior to any attachment of the locking mechanism to the structural part, comprises substantially an entire side of the housing being open prior to any attachment of the locking mechanism to the structural part;
the base of the housing includes raised edges;
the receptacle extends at least through the base; and
the raised edges at least partially
(a) define the second opening, and
(b) extend around the second opening.

23. A combination that is for being locked to a mating element that is fixed on a vehicle or fixed on a vehicle seat, the combination comprising:
a structural part fixed on a structure, wherein the structure is selected from the group consisting of the vehicle seat and the vehicle; and
a locking mechanism including
(a) a housing having at least a first opening and a second opening, wherein
(1) the first opening is a receptacle for receiving the mating element,
(2) the second opening is larger than the receptacle, and
(3) the second opening is sized so that the housing is substantially open prior to attachment of the locking mechanism to the structural part,
(b) a latch pivotably mounted to the housing
(1) for locking with the mating element by being in a locked state while the mating element is in the receptacle, and
(2) so that the latch obstructs the receptacle during the locked state, and
(c) at least one securing element pivotably mounted to the housing for interacting with the latch and thereby releasably securing the latch in the locked state,
wherein
(a) the locking mechanism is attached to the structural part so that
(1) the structural part substantially closes the housing by at least substantially covering the second opening, and
(2) the locking mechanism is strengthened by the structural part;
(b) the housing includes an outermost periphery;
(c) the structural part includes an outermost periphery that is substantially larger than the outermost periphery of the housing;

(d) the locking mechanism is configured so that operability of the locking mechanism is capable of being tested while the housing is substantially open prior to attachment of the locking mechanism to the structural part;
(e) the operability of the locking mechanism comprises
  (1) the latch being capable of being in the locked state and
  (2) the at least one securing element being capable of interacting with the latch and thereby releasably securing the latch in the locked state
(f) the housing being substantially open, prior to attachment of the locking mechanism to the structural part, comprises substantially an entire side of the housing being open prior to attachment of the locking mechanism to the structural part;
(g) the base of the housing includes raised edges;
(h) the receptacle extends at least through the base; and
(i) the raised edges at least partially
  (1) define the second opening, and
  (2) extend around the second opening.

24. A combination that is for being locked to a mating element that is fixed on a vehicle or fixed on a vehicle seat, the combination comprising:
a structural part fixed on a structure, wherein the structure is selected from the group consisting of the vehicle seat and the vehicle;
a locking mechanism including
  (a) a housing having at least a first opening and a second opening, wherein
    (1) the first opening is a receptacle for receiving the mating element,
    (2) the second opening is larger than the receptacle, and
    (3) the second opening is sized so that the housing is substantially open prior to attachment of the locking mechanism to the structural part,
  (b) a latch pivotably mounted to the housing
    (1) for locking with the mating element by being in a locked state while the mating element is in the receptacle, and
    (2) so that the latch obstructs the receptacle during the locked state, and
  (c) at least one securing element pivotably mounted to the housing for interacting with the latch and thereby releasably securing the latch in the locked state; and
at least one fastening element mounted for axially holding the housing and the structural part together so that
  (a) the locking mechanism is attached to the structural part,
  (b) the structural part substantially closes the housing by at least substantially covering the second opening, and
  (c) the locking mechanism is strengthened by the structural part,
wherein
  (a) at least one end of the fastening element is mounted by way of at least one attachment selected from the group consisting of a cohesive material joint attachment and a form-fitting attachment,
  (b) the latch being pivotably mounted to the housing comprises the latch being pivotably supported at a first location,
  (c) the at least one securing element being pivotably mounted to the housing comprises the at least one securing element being pivotably supported at a second location, and
  (d) the fastening element proximate at least one of the first location and the second location.

25. The combination according to claim 24, wherein:
the latch being pivotably mounted to the housing and pivotably supported at the first location comprises the latch being pivotably mounted on a projection that extends from the housing, and
the fastening element extends through the projection.

26. The combination according to claim 24, wherein:
the at least one securing element being pivotably mounted to the housing and pivotably supported at the second location comprises the at least one securing element being pivotably mounted on a projection that extends from the housing, and
the fastening element extends through the projection.

27. The combination according to claim 24, wherein:
the locking mechanism is configured so that operability of the locking mechanism is capable of being tested while the housing is substantially open prior to attachment of the locking mechanism to the structural part;
the operability of the locking mechanism comprises
  (a) the latch being capable of being in the locked state, and
  (b) the at least one securing element being capable of interacting with the latch and thereby releasably securing the latch in the locked state;
the housing being substantially open, prior to attachment of the locking mechanism to the structural part, comprises substantially an entire side of the housing being open prior to attachment of the locking mechanism to the structural part;
the base of the housing includes raised edges;
the receptacle extends at least through the base; and
the raised edges at least partially
  (a) define the second opening, and
  (b) extend around the second opening.

* * * * *